United States Patent [19]

Sharp et al.

[11] Patent Number: 5,385,505

[45] Date of Patent: Jan. 31, 1995

[54] PRESSURE MAINTENANCE SYSTEM FOR SUBSTANTIALLY SEALED SPACE

[75] Inventors: Gordon P. Sharp, Newton, Mass.; Eric Desrochers, Nashua, N.H.

[73] Assignee: Phoenix Controls Corporation, Newton, Mass.

[21] Appl. No.: 86,648

[22] Filed: Jul. 2, 1993

[51] Int. Cl.$^6$ ............................................. F24F 11/04
[52] U.S. Cl. ...................................... 454/238; 454/61
[58] Field of Search ........................... 454/59, 61, 238

[56] References Cited

U.S. PATENT DOCUMENTS 5,205,783  4/1993  Dieckert et al. ................... 454/238
5,304,093  4/1994  Sharp .................................. 454/61

OTHER PUBLICATIONS

Model 1660P Room Pressure Control System (Pneumatic Actuator) Features and Specifications Data Sheet TSI Incorporated.
Model 1660E Room Pressure Control System (Electric Actuator) Features and Specifications Data Sheets (2 pages) TSI Incorporated.
Velocitrol, Honeywell, Form No. 77-7518, Six Pages.
Solo/FX, American Auto-Matrix, Direct Digital Control for Laboratory and/or Fume Hood Applications, 4 pages.
LAB-Master Air Pressurization Control Center, For the Measurement and Assured Control of Laboratories at Positive, Neutral, or Negative Pressurization Levels, 5 pages.
Voltec Digital Control Systems, Working Solutions to Complex HVAC system control Problems, 3 pages.
Connor BRD, Pneumavalve Air Controllers, Connor Engineering, 8 pages.
Trane, The Future of Air Modulation is Now, The Trane Company, 8 pages.
Price Type R Controller, E. H. Price Limited, pp. 1 to 20.
Trox Volume Flow Regulator Type R. Trox America, Inc., Trox Technical Information, 4 pages.
Venturi Engineering Bulletin, Hand Crafted Pressure Independent Air Valves, 4 pages.
Venturi Air Valve, Air Precision Devices, 3 pages.
Rosemex, Air Terminal Unit Mark Air Valves, 7 pages.
M&I Valve, VAV International Air Valve, 7 pages.
Progressive Technologies, Inc., Sentry Air-Control Systems, 7 pages.
American Aldes Ventilation Corporation, Backdraft Dampers, 2 pages.
American Aldes Ventilation Corporation, Constant Airflow Regulator (Car), 4 pages.
Series 30, Bray Valve & Controls, 5 pages.
PBD10 & OBD10 Air Control Dampers, 2 pages.
Flanders Low Leak Convex Dampers, Bulletin No. 881, Flanders Filters, Inc., 4 pages.
Positive Seal Damper, Aerodynamics Engineering and Testing Laboratory Ltd., M&I Heat Transfer Products, 10 pages.
Airflow Control and the Pressurization of Bacterial and Viral Research Laboratories, etc., Air Monitor Corporation, 20 pages.

*Primary Examiner*—Harold Joyce
*Attorney, Agent, or Firm*—Wolf, Greenfield & Sacks

[57] ABSTRACT

A system for maintaining a desired pressure (either positive or negative with respect to surrounding) in a sealed room or other substantially sealed closed space has a gas supply and a gas exhaust connected to the space through a supply flow control element and an exhaust flow control element, respectively. A tracking one of the two control elements has its flow controlled in response both to the measured pressure in the space and to an indication of flow through the other, driving flow control element. The flow control elements are adapted to provide a designed, at least nominal effective leakage for the space with changes in the pressure differential between the space and at least one of the gas supply and gas exhaust. For preferred embodiments, the effective leakage is achieved by either mechanically or electronically modifying the flow/pressure characteristic of at least one of the valves to have a designed, at least nominal change in flow for changes in pressure across the element.

20 Claims, 10 Drawing Sheets

PRESSURE MAINTENANCE SYSTEM FOR SUBSTANTIALLY SEALED SPACE

FIELD OF THE INVENTION

This invention relates to space pressurization control systems and more particularly to pressure control systems for maintaining a desired pressure in a substantially sealed room or other enclosed and substantially sealed space.

BACKGROUND OF THE INVENTION

As laboratory work has increased in fields such as biotechnology, chemistry and medicine with substances having substantial (and in many instances not understood) dangers, there is increasing need to assure that substances do not migrate from the laboratory into the atmosphere. As a result, various containment levels have been established for rooms or other spaces in which experiments on these substances are performed, which standards include biological level 3 and level 4 (BL3, BL4). For each each of these standards, a degree of sealing is required for the room, with a selected low level of leakage being permitted and with required pressure control tolerances.

Similar problems arise for semiconductor and other processes which must be conducted in a "clean room" or aseptic (i.e. class 1000) environment to avoid contaminants. Such clean rooms are typically sealed and positively pressurized to assure that undesired contaminants do not get in.

In most sealed environments, whether they are to be positively or negatively pressurized, air must be exhausted from and supplied to the room in order to remove potentially dangerous elements (exhausted through a fume hood, for example) while maintaining room pressure. Also, supply airflow may be modulated to control room temperature, ventilation (i.e. air changes per hour), and humidity; all of which must be accomplished without compromising room pressurization. However, in order to maintain a prescribed pressure in the sealed space, exhaust and supply flows must be very precisely controlled because even small imbalances between supply and exhaust can cause large errors in room pressurization. For example, a 3% error in flow control may result in errors in room pressure that are orders of magnitude larger. This effect becomes more pronounced as the pressurized environment is sealed more tightly as a result of the fact that:

$$\Delta P = (\Delta F / K)^2$$

where, $\Delta P$ = room pressure relative to some outside pressure reference (usually atmospheric pressure).

$\Delta F$ = air supplied to the room minus air exhausted from the room. This quantity is known as room offset.

$K$ = a coefficient which decreases exponentially as a room is sealed more tightly.

Therefore, the required accuracy on the flow controllers increases exponentially as room permeability or gas leakage is decreased. In some cases, such as with BL4 facilities where an impervious environment is sought, the required tolerance of flow control, using conventional flow sources, approaches zero. As a result, significant difficulty has been experienced in maintaining desired pressure levels in sealed environments.

In addition to being precise, the flow/pressure controller for sealed spaces must be capable of responding quickly to compensate for pressure fluctuations due to the natural characteristics of the surroundings. Here, the volume of the sealed space will largely dictate the natural frequency at which perturbations in room pressure occur. The affinity for pressure oscillations is high in a sealed environment so, regardless of the accuracy of flow control, the pressure control scheme must provide suitable compensation for this characteristic. As volume is decreased, the frequency of natural oscillation (independent of outside influence) increases. Thus, small sealed environments are most difficult to pressurize. The resulting shorter transient response to pressure in smaller spaces makes pressure control by way of conventional systems unreliable, since these devices cannot respond quickly enough to compensate for pressure fluctuations to be realized. The prior art techniques thus tend to be highly unstable.

As a result, significant difficulty has been experienced in maintaining desired pressure levels in sealed environments, particularly in relatively small sealed environments. Some prior art systems have used control loops to control the flow through control elements, such as dampers or valves, in an attempt to independently maintain the supply flow control element and the exhaust flow control element at desired flow levels. Such schemes have had problems since they do not take account of pressure in the room and are therefore unable to maintain a desired pressure. Thus, slight errors in one of the flow control elements, or the controls therefor, can cause errors in room pressure.

An improvement on this is to measure air flow at the output from one of the flow control elements, for example at the exhaust element for the room, and to feed this measured flow back to control the flow through the other element, for example the supply element. This scheme is better, but becomes unstable when there is a spurious change in the output flow. The speed of system operation is normally not rapid enough to compensate for such fluctuations resulting in numerous overshoots and undershoots until a stable flow between the two valves is again restored. The effect of this instability on room pressure can be unpredictable.

A further improvement on such systems is to include a pressure transducer in the room which provides a measurement of room pressure relative to some pressure reference that is compared with a desired setpoint pressure. The resulting pressure differential can be fed back to control changes in operation of the flow control element. However, if the system starts to oscillate, such pressure control may become unreliable.

Another potential problem is that some valves, such as dampers, vary the flow therethrough as a function of the pressure thereacross. Since the supply duct or plenum and the exhaust duct or plenum for a given room may also serve other similar rooms in the same building, pressures in the ducts may vary as a result of what is happening elsewhere in the building, and this in turn will result in a change in flow through the dampers leading to the room being controlled. This coupling of the sealed room to other rooms or areas in a building is undesirable.

To avoid such coupling, a tracking loop may be provided for the damper or other valve which renders the flow through the valve substantially independent of the pressure thereacross. Standard venturi valves, of a type known in the art, have a similar, substantially flat, flow versus pressure characteristic through most of their operating range. However, the pressure in a room will be determined by the point at which the characteristic flow versus pressure curves for the input flow control element and the exhaust flow control element are the same. With flat, pressure independent regions, and particularly where there may be slight ripples in such regions, there are multiple points at which equilibrium for the flow elements occurs, causing the system to oscillate and to be unstable, with room pressure being unpredictable.

A need therefore exists for an improved pressurization control system for sealed spaces which provide only a single pressure at which the flows for the supply and exhaust flow control elements match, while still substantially decoupling the sealed space from the ducts which access the space and thus from surrounding areas of the building containing the space. It is also desirable that such a system permit the two flow control elements to act in tandem without reacting to spurious changes in flow through one of the elements, thus assuring that the system rapidly responds to pressure affecting changes without instability and without overshoots and undershoots. Finally, such system should be capable of damping pressure oscillations or resonance to a level below that at which the system responds to pressure changes so as to prevent such oscillations from adversely affecting system control even for tightly sealed rooms.

SUMMARY OF THE INVENTION

In accordance with the above, this invention provides a system for maintaining a desired pressure in a sealed room or other substantially sealed enclosed space. The desired pressure may either be above that of the surrounding atmosphere to provide an aseptic or clean room atmosphere where contaminants are kept out, or the pressure in the room may be below that of the surrounding environment to prevent potentially toxic contaminants from escaping the room or other space. The room is connected to a gas supply at a pressure above the desired pressure in the room through a supply flow control element and is connected to a gas exhaust at a pressure below the desired pressure through an exhaust flow control element. The system generates a first signal indicative of the instantaneous pressure in the room, for example, from a pressure transducer located in the room, and also generates a second signal indicative of intended air flow through a driving one of the two flow control elements. A control is provided which is responsive to the first and second signals for controlling the air flow through a tracking one of the two control elements (i.e. the element which the second signal is not indicative of air flow for). Finally, the system includes a means for providing a designed, at least nominal, effective leakage for the space with changes (i.e. increases or decreases) in the pressure differential between the space and at least one of the gas supply and gas exhaust.

The designed, at least nominal, effective leakage may be obtained in a number of ways. One way is to utilize as a flow control element a valve which has been mechanically modified so as to have a flow/pressure characteristic which exhibits slight changes in flow (ie. increases or decreases) for changing pressures across the valve. A similar flow/pressure characteristic to provide the desired effective leakage may be obtained electronically by either utilizing a valve, such as a venturi valve, which has a substantially flat flow/pressure characteristic, by detecting the instantaneous pressure differential across the valve, and by utilizing the measured pressure differential to modify a flow control signal applied to the valve in a manner such that the flow through the valve exhibits the desired flow/pressure characteristic; or by using a pressure dependent element valve, such as a damper, detecting instantaneous pressure across the valve, and by utilizing the detected pressure differential to modify a flow control signal for the valve so as to achieve the desired flow/pressure characteristic. Other electronic control techniques might also be employed to achieve the desired characteristic. Another way in which the desired effective leakage (i.e. the desired flow/pressure characteristic) may be achieved is to provide a pressure dependent element, for example a damper, in parallel with at least one pressure independent valve, the permitted flows through the two elements being such that the combined effective flow/pressure characteristic of the two elements in parallel exhibits the at least nominal changes in flow with changing pressure required to achieve the desired effective leakage. A number of damper bypass configurations are possible, including some in which the sealed space itself is part of one of the two parallel paths.

Further, the normally pressure dependent or leakage element may be either the exhaust flow control element or the supply flow control element, and in some situations it may be desirable for both elements to be slightly pressure dependent. In addition, the driving one of the control elements may be either the exhaust or the supply flow control element with the tracking one of the flow control elements being the other element. For preferred embodiments, each of the flow control elements is a venturi valve, with the venturi valve for the leakage control element being only partially independent of pressure changes thereacross, while the venturi valve for the nonleakage one of the control elements may have a flow characteristic which is substantially independent of pressure over the operating pressure range of the element. The air flow controller for the tracking element preferably includes a pressure set point input for receiving a signal indicative of desired pressure in the space and a means for generating a pressure error signal in response to the difference between the pressure set point signal and the first signal indicative of measured pressure in the room. The air flow controller further includes, for preferred embodiments, a means for combining the pressure error signal with the second signal indicative of intended air flow through the driving flow control element to generate an air flow control signal for the tracking control element.

For a preferred embodiment, the pressure error signal generator or pressure controller includes an input for an indication of flow from the tracking control element and a means responsive to this indication of flow for modifying the error signal so as to limit the rate of change in flow for the tracking control element. This causes the tracking element to move at a relatively low speed through more of its path to assure that overshoots do not occur. The system may also be fine-tuned by having the pressure error generating device include a means for generating a lag compensation signal and for utilizing the lag compensation signal to fine tune the control flow through the tracking control element.

The foregoing and other objects, features and advantages of the invention will be apparent from the following more particular description of preferred embodiments of the invention as illustrated in the accompanying drawings.

IN THE DRAWINGS

FIG. 1A and FIG. 1B are exemplary flow/pressure characteristic curves for the supply valve and exhaust valve, respectively, for the embodiment of the invention shown in FIG. 1.

FIGS. 8A and 8B are exemplary flow/pressure characteristic curves for the uncompensated supply valve (i.e. not the effective characteristic curve for this valve) and exhaust valve, respectively, for the embodiment of the invention shown in FIG. 8.

DETAILED DESCRIPTION

Figure 1:
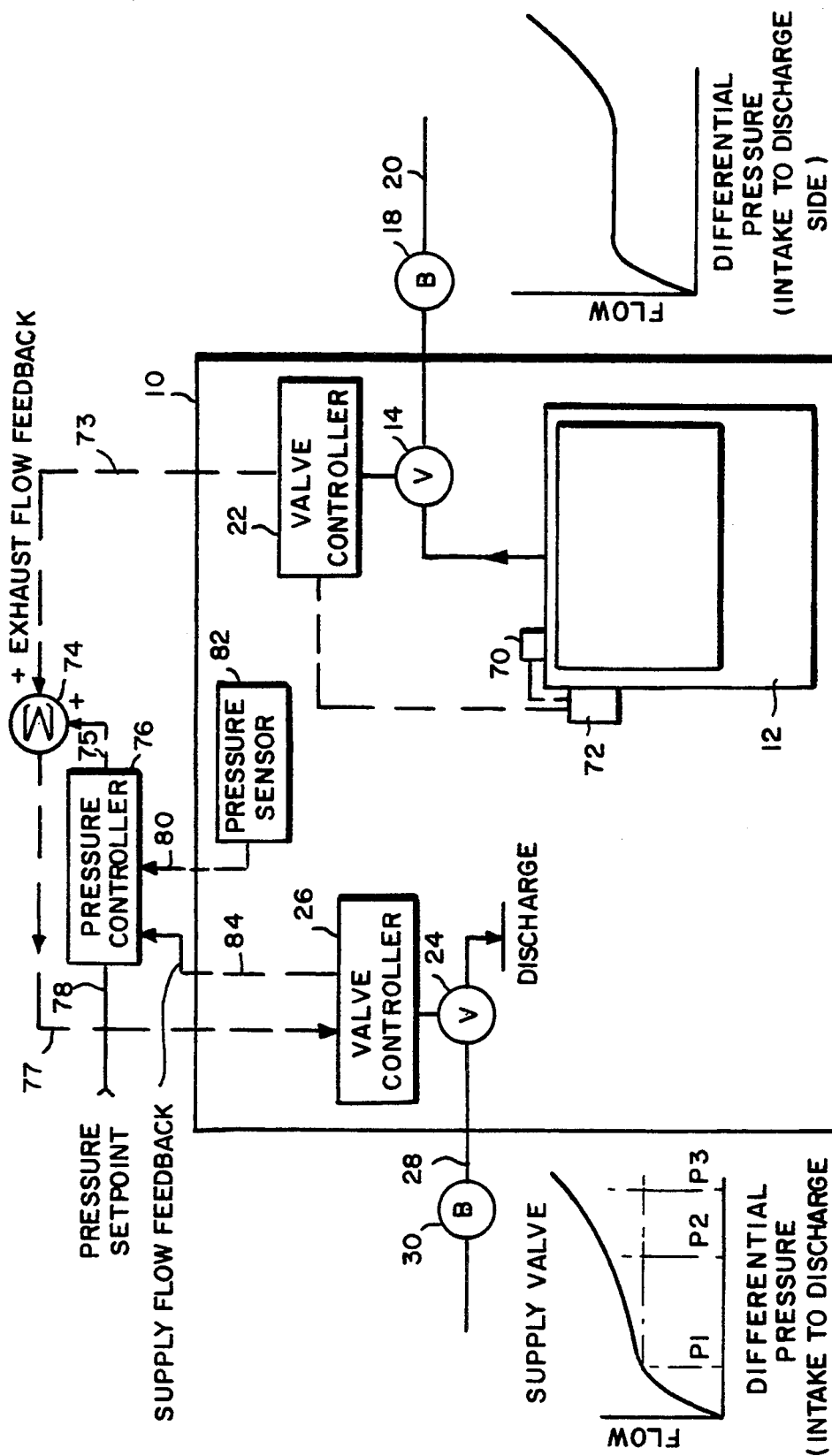
FIG. 1 is a block schematic diagram of a pressure maintaining system for a first embodiment of the invention.

Referring to FIG. 1, a sealed room 10 is schematically indicated, which room contains a fume hood 12. For purposes of illustration, it is assumed that the pressure in room 10 is to be maintained below that of the surrounding area so as to provide a desired level of containment. Air is exhausted or removed from room 10 through fume hood 12, exhaust valve 14 and duct 20 to atmosphere 16 which is assumed to be at higher pressure than room 10. A blower 18 may be provided in the exhaust duct to facilitate the removal of air through fume hood 12 and the air outputted through duct 20 from blower 18 may be passed through suitable cleaning elements to remove contaminants or may be otherwise treated to detoxify the air before it passed into the atmosphere. Exhaust valve 14 operates under control of valve controller 22 to determine the flow rate at which air is exhausted from room 10.

Similarly, a supply valve 24 operating under control of a valve controller 26 determines the flow rate of air entering room 10 from duct 28. A blower 30 may be provided in duct 28 to facilitate the flow of air into the room.

Figure 2:
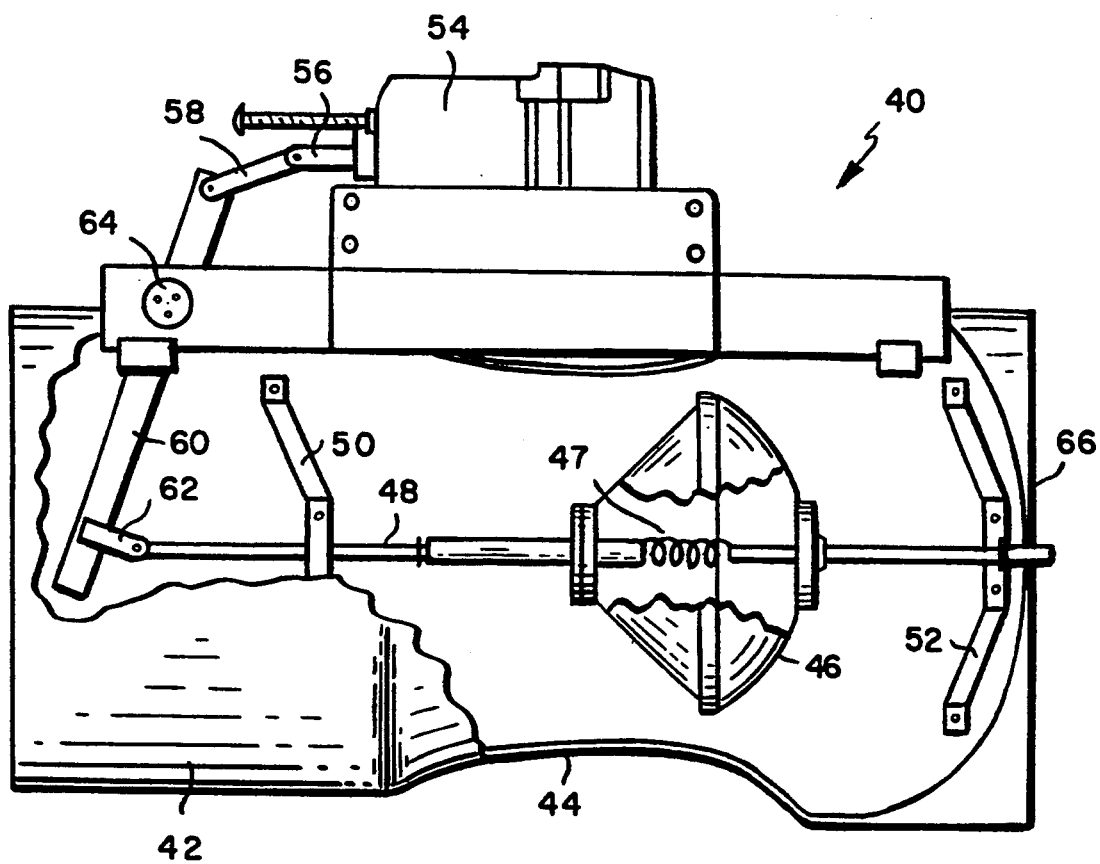
FIG. 2 is a partially cut-away side view of a venturi valve suitable for use as either one of the valves shown in FIG. 1.

For a preferred embodiment, valves 14 and 24 are venturi valves of, for example, a type shown in FIG. 2. These valves, which are known in the art, have the unique characteristic that, over the normal operating range of the valve, the valve has flow/pressure characteristics of the type shown in FIG. 3 wherein, over a pressure differential across the valve varying from approximately 0.5 to 3.5 inches $H_2O$, the air flow through the valve is substantially independent of the pressure thereacross. More particularly, referring to FIG. 2, the venturi valve 40 has a housing 42 with a reduced diameter throat 44. A cone 46 having a spring package 47 therein is mounted on a shaft 48 so as to be positioned in housing 42 near throat area 44. Shaft 48 is supported in housing 42 by a pair of brackets 50 and 52. The position of shaft 48 in housing 42, and thus of cone 46 in throat 44, is controlled by an actuator 54 through linkages 56 and 58, pivot arm 60 and linkage 62. A potentiometer 64 located at the pivot point provides an output which is indicative of the position of shaft 48 and thus of cone 46 in throat 44.

The position of cone 46 in throat 44 determines the flow volume through valve 40, the volume being greater when cone 46 is moved to the right out of throat 44 and being less when the cone is moved to the left into the throat. Since cone 46 has spring package 47 therein which compensates for pressure differences across the valve between intake side 66 and discharge or exhaust side 68, flow through the valve is independent of such pressure differential and is dependent solely on the position of shaft 48. A calibration curve may, therefore, be generated for the valve with the output from potentiometer 64 being indicative of flow as well as of shaft position.

Referring back to FIG. 1, valve controller 22 provides the control input to actuator 54 for exhaust valve 14. The inputs to this valve controller are standard valve control inputs for a fume hood such as those disclosed in U.S. Pat. No. 4,706,553 and may, for example, include the position of the fume hood sash as detected by a sash sensor 70 and a desired containment level or flow rate from a control such as fume hood monitor 72. The processed flow indicating signal from potentiometer 64 (FIG. 2) of the exhaust valve is applied through line 73 as an exhaust flow feedback signal to one positive input of a summing circuit 74. The second positive input to summing circuit 74 is an output on line 75 from pressure controller circuit 76. The output from summing circuit 74 is applied over line 77 as the set point or control input to valve controller 26 for supply valve 24. Pressure controller 76 has three inputs, a pressure set point input on line 78, a room pressure input on line 80 from pressure sensor 82 located in the room, and a supply flow feedback signal on line 84, this signal being the processed output from potentiometer 64 for supply valve 24.

Figure 4:
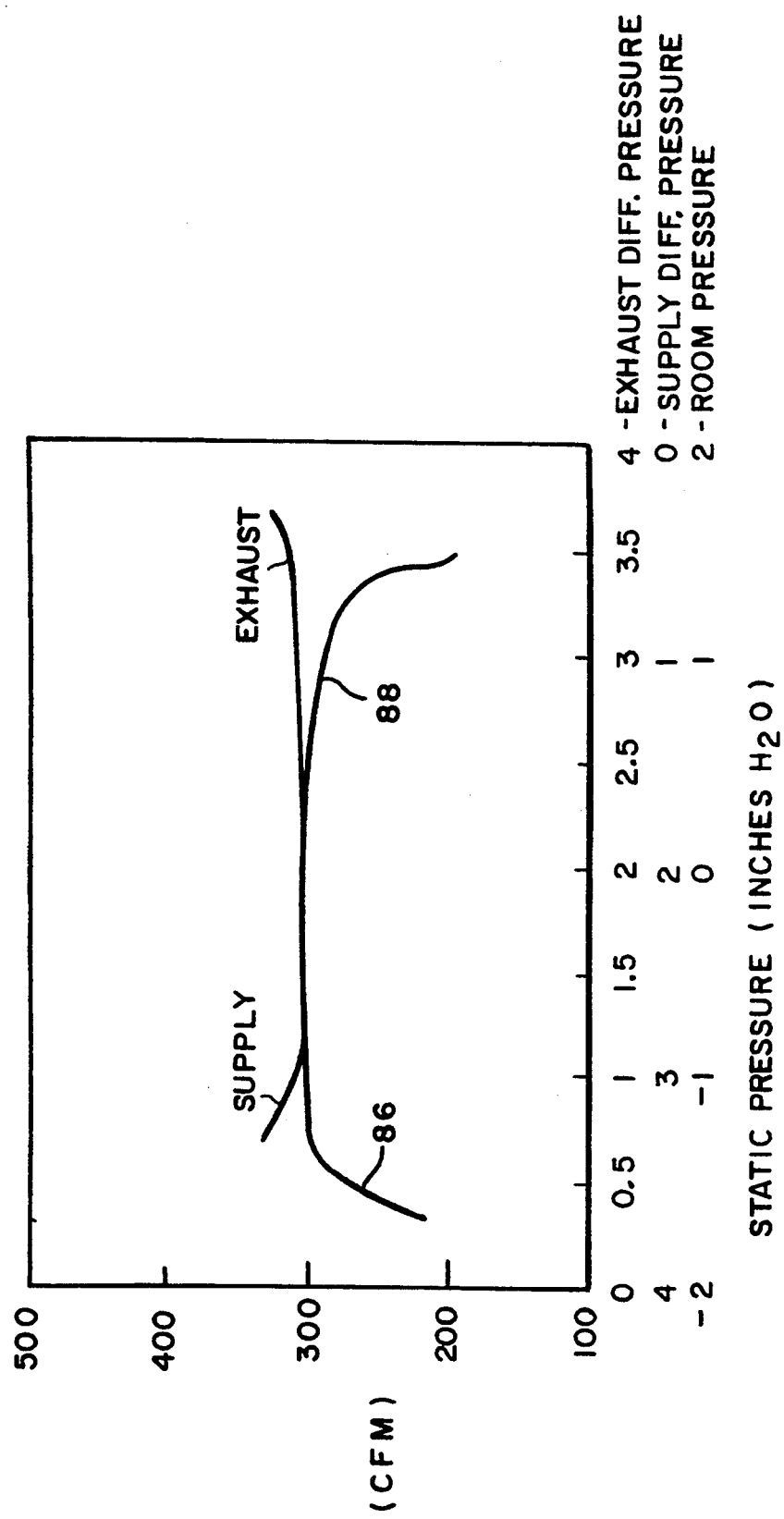
FIG. 4 are exemplary flow/pressure characteristic curves for two standard venturi valves of the type shown in FIG. 2 when used as supply and exhaust valves in a system of the type shown in FIG. 1.

FIG. 4 illustrates a potential problem if standard venturi valves such as that shown in FIG. 2 are utilized for both the supply and exhaust valves. In order to maintain a desired pressure within the room, the air flow through both valves needs to be substantially equal. This equal flow should occur at roughly the desired pressure differential for the room. However, as can be seen in FIG. 4, the curves 86 and 88 for the supply and exhaust valves, respectively, have substantially equal flows over a relatively wide range of pressure differentials. This results in there being multiple points at which equilibrium for the flow elements occurs. This will cause the system to oscillate and to be unstable as each valve tries to compensate for flow. Further, as can be seen from FIG. 4, the room pressure will not resolve to a single value; rather, it will fluctuate indefinitely in accordance with the multiple levels of pressure at which prescribed flow may be satisfied. While typically the curves would not actually overlap over an extended region as shown in FIG. 4, at least one and generally both curves have ripples in them which result in there being multiple equilibrium points and causing the problems discussed above.

Another problem with the embodiment shown in FIG. 1, if valves having flat characteristics were utilized, is that the room has so little leakage that, for reasons previously discussed, oscillation in the room cannot be adequately dampened, resulting in unacceptable pressure variations in the sealed room environment. However, any normal orifice from the room to its surrounding environment which would enhance leakage could also result in the room not conforming to the applicable sealing standard.

In accordance with the teachings of this invention, the problems indicated above are overcome for a first embodiment by modifying at least one of the venturi valves, for example, supply valve 24 in FIG. 1, so that it has a characteristic such as that shown in FIG. 1A with a controlled, designed nominal pressure dependence. This may, for example, be accomplished by loading or otherwise modifying the spring package 47 within cone 46, for example by the addition of washers or by other suitable means. It may also be accomplished by using a valve element other than a venturi valve which has a controllable flow/pressure characteristic.

Figure 5:
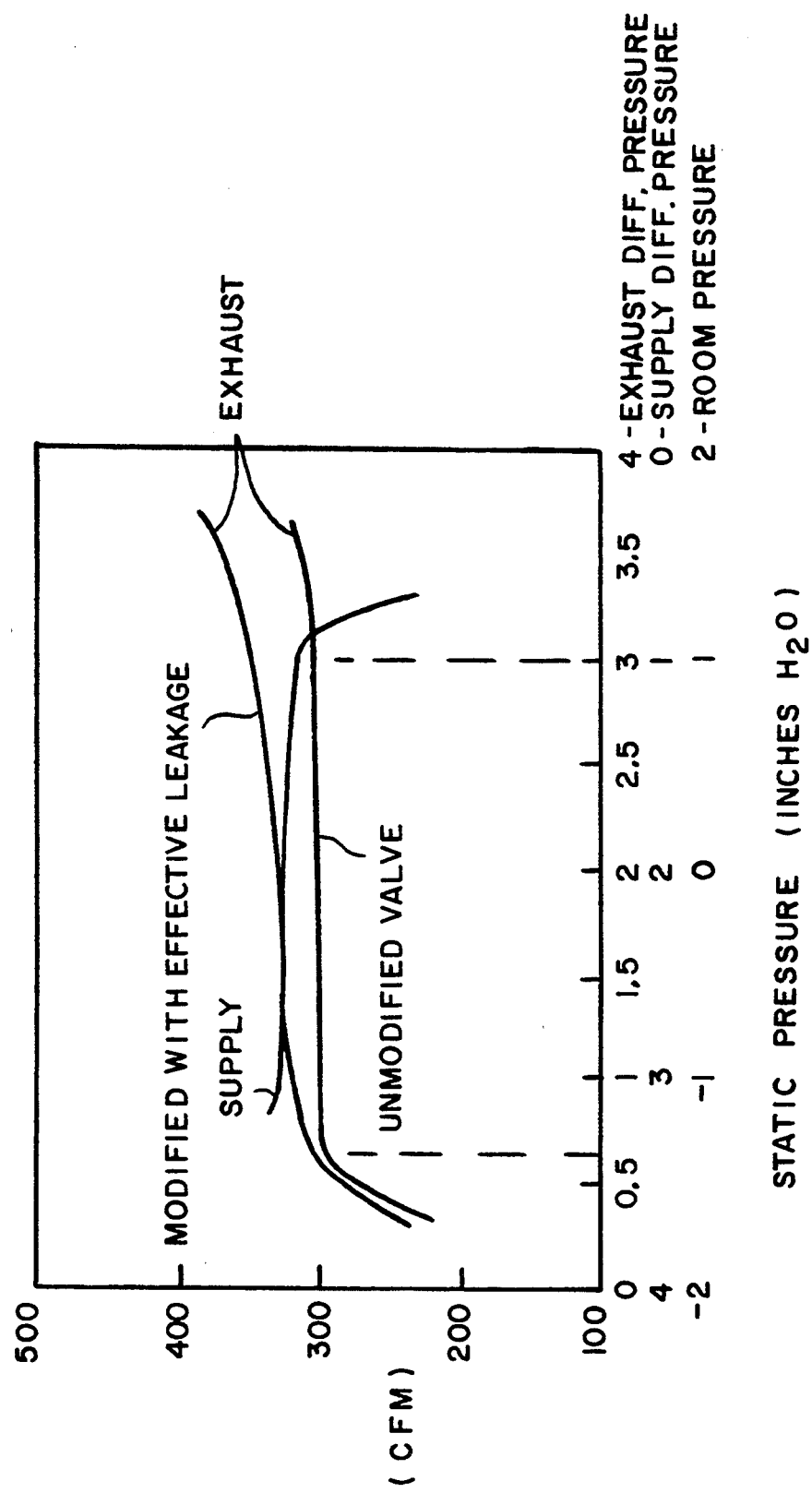
FIG. 5 are exemplary flow-pressure characteristic curves for valves of the type shown in FIG. 1 in accordance with the teachings of this invention.

As may be seen in FIG. 5, having one of the valves with a nominal leakage flow/pressure characteristic assures that there is a unique pressure at which the flows for the two valves are equal, eliminating the instability problem previously discussed in conjunction with FIG. 4. Further, since the valve is somewhat pressure dependent, variations in pressure within the room caused by oscillation result in a corresponding change in air flow into the room, which air flow variations tend to counteract or damp the vibrations. The valve thus provides an effective "leakage" for damping purposes. In particular, the damping should be sufficient so that fluctuation amplitudes are low enough to be ignored by the system. More specifically, such pressure variations should be less than ±5 Pasquel for a typical sealed room application. The flow/pressure characteristics displayed in FIG. 1A and for the supply valve in FIG. 5 are relatively constant, in terms of the percentages of flow change realized with a change in differential pressure, over the operating flow range of the modified device. Therefore, if flow increases by 20%, as valve differential pressure is increased by a given amount, the same will approximately be true at any other flow setpoint. This means that, as flow setpoint is increased, the magnitude of the flow change as pressure across the valve is varied will be larger. Thus, at higher flows, the effective leakage offered by the valve will be more pronounced and the degree of damping provided to the sealed room will be more significant. This is an important aspect of the modified valve, because more damping is required at higher flows, due to the larger pressure variations which are induced at higher flows. However, while this is clearly preferred, the ivnention could also be practiced where the flow/pressure characteristics are magnitude based rather than percentage based (i.e. the magnitude of the flow change for a given pressure change is the same for all pressure set points).

As previously discussed, one potential problem with having pressure dependent valves in the system is that they tend to couple pressure variations into room 10 from other parts of the facility to which, for example, duct 28 may be connected. However, it is important in such systems that the pressure in room 10 be controlled independent of pressure variations in other rooms to assure proper operation of the system. Thus, the need to have a slightly pressure dependent valve for stability and damping must be balanced against the need to have a pressure independent valve to isolate room 10 from the remainder of the system. This may generally be accomplished by having a pressure dependence in the 5% to 20% range for the pressure dependent or leakage valve with a 15% to 20% leakage being preferred. Another option which may be advantageous in some applications is for both the supply and exhaust valves to be slightly pressure dependent.

Figure 6:
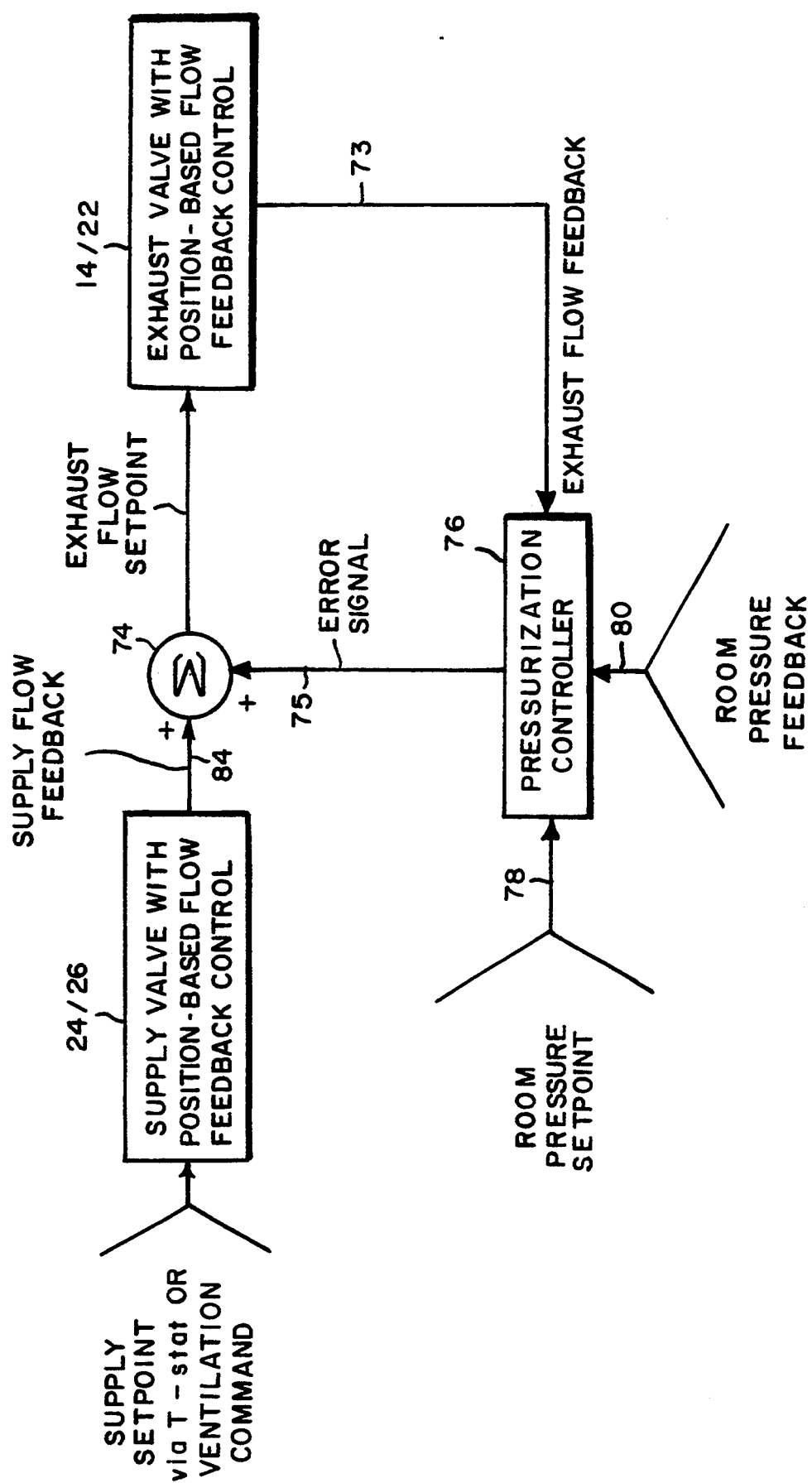
FIG. 6 is a simplified block schematic diagram for a modified embodiment of the invention shown in FIG. 1.

FIG. 6 is a simplified block diagram of an alternative embodiment of the invention which differs from that shown in FIG. 1 primarily in that the driving valve is the supply valve and the tracking valve is the exhaust valve rather than the reverse situation shown in FIG. 1. For ease of understanding, the same reference numerals have been used for common elements in all figures. The primary differences between the embodiments of FIGS. 1 and 6 are that, rather than the control input to the supply valve controller 26 coming from summing circuit 74, this input is a supply set point command which may come from a thermostat, ventilation system or the like. Thus, air is supplied to the room to maintain a desired temperature and/or humidity and to provide required ventilation for the room. The exhaust controller tracks the supply control and is also responsive to pressurization errors to maintain the desired pressure in the room. With the embodiment shown in FIG. 6, either of the valves may be the "leakage" valve which has a slightly pressure dependent flow characteristic. However, for this embodiment, it is preferable that either the exhaust valve have this characteristic or that both valves have a small amount of leakage for the reasons previously discussed.

Figure 7:
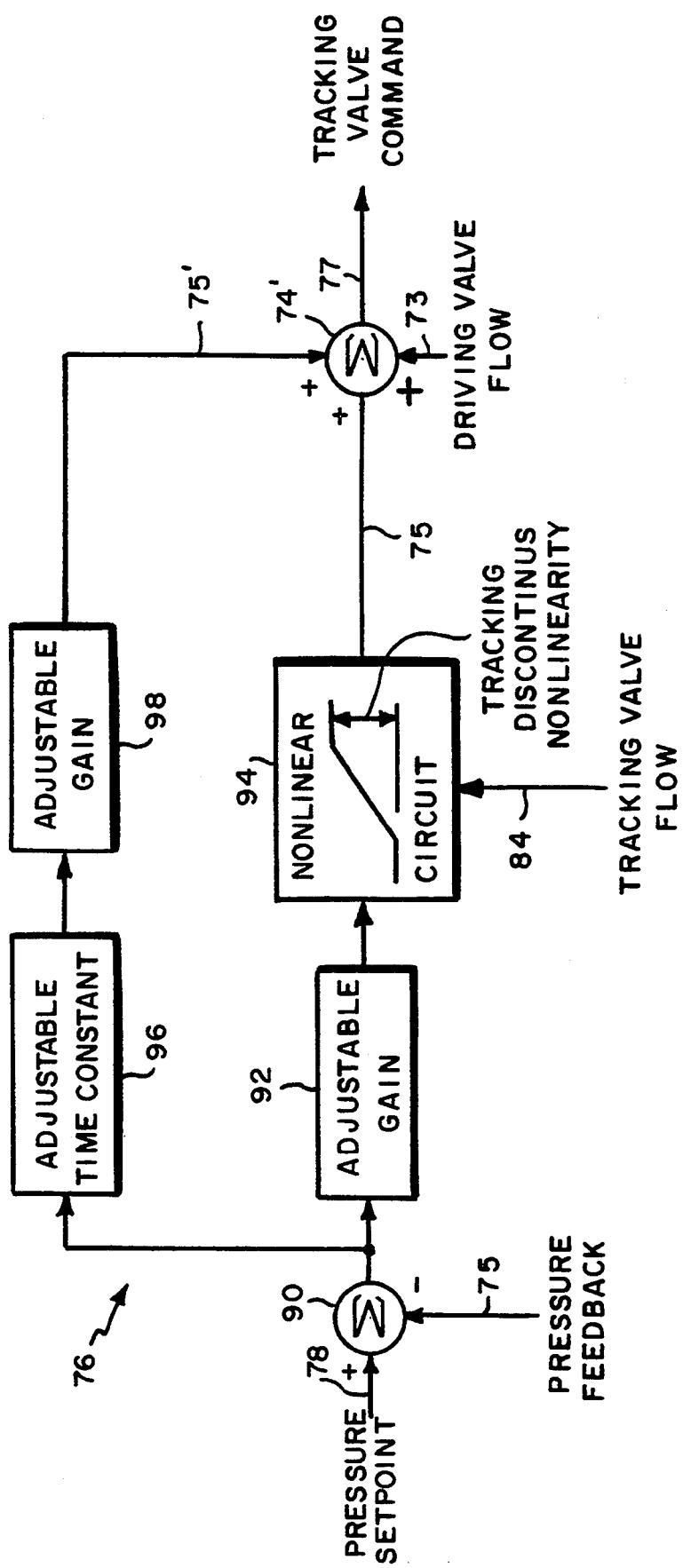
FIG. 7 is a schematic block diagram of a pressure controller suitable for use in the embodiment shown in FIG. 1.

FIG. 7 is a block diagram of a pressure controller suitable for use as the pressure controller 76 in FIGS. 1 and 6. Referring to this figure, the pressure feedback signal on line 75 and the pressure set point signal on line 78 are applied as a negative and a positive input, respectively, to a summing circuit 90. The output from summing circuit 90 is the pressure error signal. This signal is applied through an adjustable gain circuit 92 to a nonlinear circuit 94. The other input to circuit 94 is the signal on supply or tracking valve flow feedback line 84. The output from circuit 94 on line 75 is applied as one of the inputs to summing circuit 74, the output from which provides the tracking valve command. Circuit 94 is required for a preferred embodiment where the valve control circuit is of a type shown and described in copending application Ser. No. 07/822,088, filed Jan. 17, 1992, wherein the actuator moves the valve shaft and cone at a higher speed for large travel and at a lower speed for short travel. By monitoring the position of the tracking valve, circuit 94 limits the amplitude of the signal from circuit 92 so that it, by itself, cannot trigger a higher speed response from the valve controller of the tracking valve. However, the higher speed response may be triggered in conjunction with a suitably large change from the driving valve flow input or, in some cases, from the signal injected into summing stage 74 by the output of circuit 98. The lower speed mode, or small signal realm of operation, of the valve controller is realized when one of the following conditions is satisfied:

| | | | | |
|---|---|---|---|---|
| 90% of Valve Flow Feedback | < | Valve Controller Flow Setpoint | < | 99% of Valve Flow Feedback |
| | | OR | | |
| 101% of Valve Flow Feedback | < | Valve Controller Flow Setpoint | < | 110% of Valve Flow Feedback |

Circuit 94 assures lower speed response from the tracking valve controller to the output of circuit 92 (indicative of error in room pressurization) by limiting this output to +/−0.1 [valve feedback].

The pressure error signal output from summing circuit 90 is also applied through adjustable time constant circuit 96 and adjustable gain circuit 98 as another positive input to summing circuit 74, the final input to this summing circuit being the driving valve flow signal on line 73. Adjustable time constant circuit 96 is a very slow responding circuit and has little or no influence on quickly decaying transient pressure errors. Rather, this circuit helps to minimize steady-state errors that would otherwise exist at the output of summing block 90. Collectively, circuits 96 and 98 inject a signal into summing circuit 74' that increases in amplitude at a slow rate, based on the duration over which the input to circuit 96 is not nominal. The output of circuit 74', as it is influenced by circuits 96 and 98, causes the tracking valve to slowly adjust to correct for the error at the output from summing circuit 90. The gain and time constant provided by circuits 98 and 96, respectively, are adjusted so that the contribution by these circuits to overall control is only to address the removal of small errors while realizing a high degree of stability. This leg of the pressure controller (circuits 96 and 98) is thus a fine-tuning element to permit high tolerances in pressure control to be met.

Figure 8:
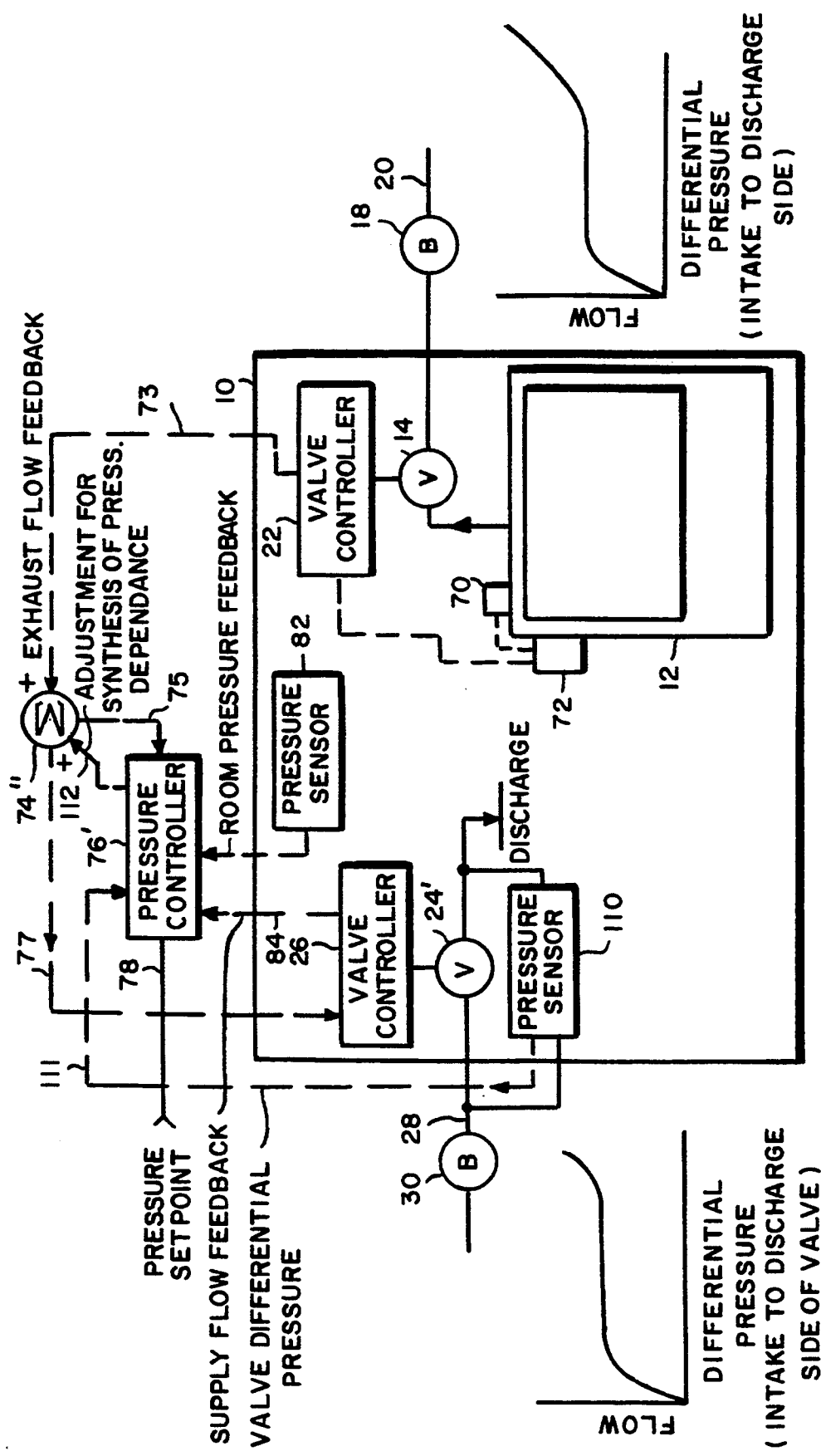
FIG. 8 is a block schematic diagram of a pressure maintaining system for still another alternative embodiment of the invention.

FIG. 8 shows an alternative embodiment of the invention which differs from that shown in FIG. 1 in that the effective leakage for the supply or tracking valve 24' is obtained electronically rather than being obtained mechanically as for the embodiment of FIG. 1. Therefore, the valve 24' is a standard venturi valve having a substantially flat flow/pressure characteristic over the operating pressure range of the valve as shown in FIG. 8A. A controlled nominal pressure sensitivity or effective leakage for valve 24' is obtained electronically by utilizing a pressure sensor 110 to detect the pressure differential across the valve. The output from pressure sensor 110 is connected as an additional input to pressure controller 76', which pressure controller otherwise has the same inputs as the pressure controller 76 shown in FIG. 1. Pressure controller 76' in addition to the output on line 75 to summing circuit 74" also has an output on line 112 to the summing circuit, which output, as will be discussed in greater detail later, is an adjustment for the synthesis of pressure dependence in the tracking supply valve.

Figure 9:
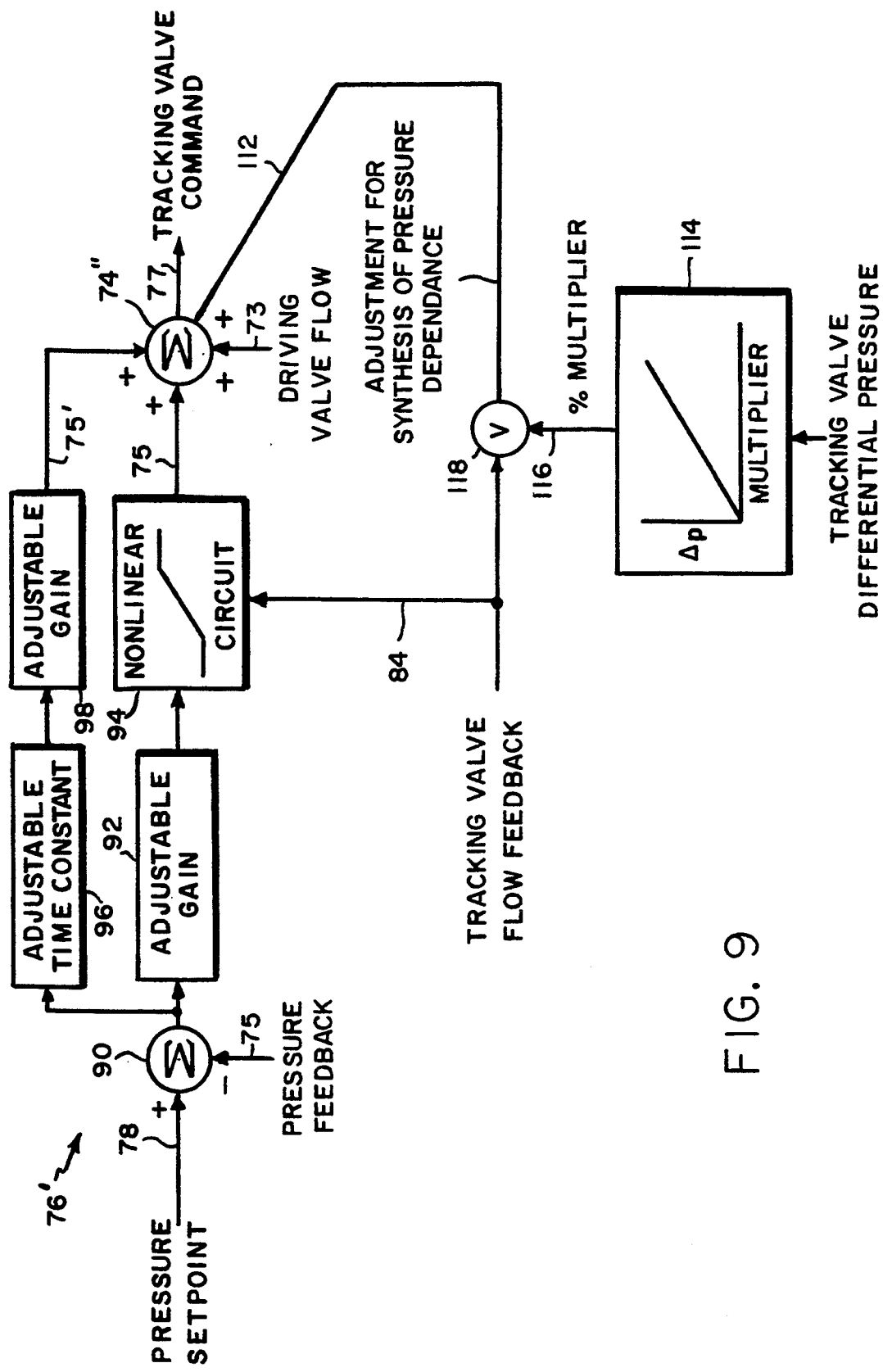
FIG. 9 is a schematic block diagram of an alternative pressure controller which is suitable for use in the embodiment of the invention shown in FIG. 8.

FIG. 9 illustrates the circuitry for a suitable pressure controller 76' and related circuitry. In addition to the components for the pressure controller 76 shown in FIG. 7, pressure controller 76' also has a circuit 114 to which the detected pressure difference across valve 24' on line 111 is applied. Circuit 114 generates an output on line 116 which is a percentage multiplier which varies as a function of the pressure differential across the valve. Circuit 114, which may, for example, be a table lookup memory, thus simulates the curve of FIG. 1A, with the output percent multiplied being, for example, 100% for pressure P1, 110% for pressure P2 and 120% for pressure P3. While a straight line is shown in box 114, the actual characteristic might have a slight curve such as that for the curve in FIG. 1A.

The signal on line 116 is applied as one positive input to multiplying circuit 118, the other input to this circuit being the tracking valve flow feedback signal on line 84. The resulting output signal is the adjustment-for-synthesis-of-pressure dependence signal on line 112 which is applied as the final input to summing circuit 74'. The output signal on line 77 to valve controller 26 thus has a pressure dependence component which causes the effective valve characteristic in operation to be substantially the same as the characteristic shown in FIG. 1A.

For most applications, the circuit of FIGS. 8 and 9 would be preferred over that of FIGS. 1 and 7 in that it permits standard venturi valves to be utilized, thus eliminating the cost of producing special valves (the additional cost of the electronics being fairly nominal), while also permitting more precise control of the effective valve leakage characteristic. In particular, the flow feedback signal to control leakage on line 111 is far more reflective of the actual flow and pressure differential than can be achieved by use of a mechanically modified venturi valve.

Another advantage for the circuits of FIGS. 8 and 9 is that the circuit may also be utilized where supply valve 24' is a pressure dependent valve, such as for example a damper, with the feedback control characteristic for circuit 114 being such as to reduce the pressure dependence to achieve the desired flow/pressure characteristic. Thus, the circuit of FIGS. 8 and 9 may be utilized with either standard pressure independent or standard pressure dependent valves or with other flow control elements to achieve the desired flow/pressure characteristic providing nominal leakage.

Further, the use of multiplier 118 assumes that a percentage based system is being utilized. Where a magnitude based system is being utilized, this circuit would be an adder rather than a multiplier.

Figure 3:
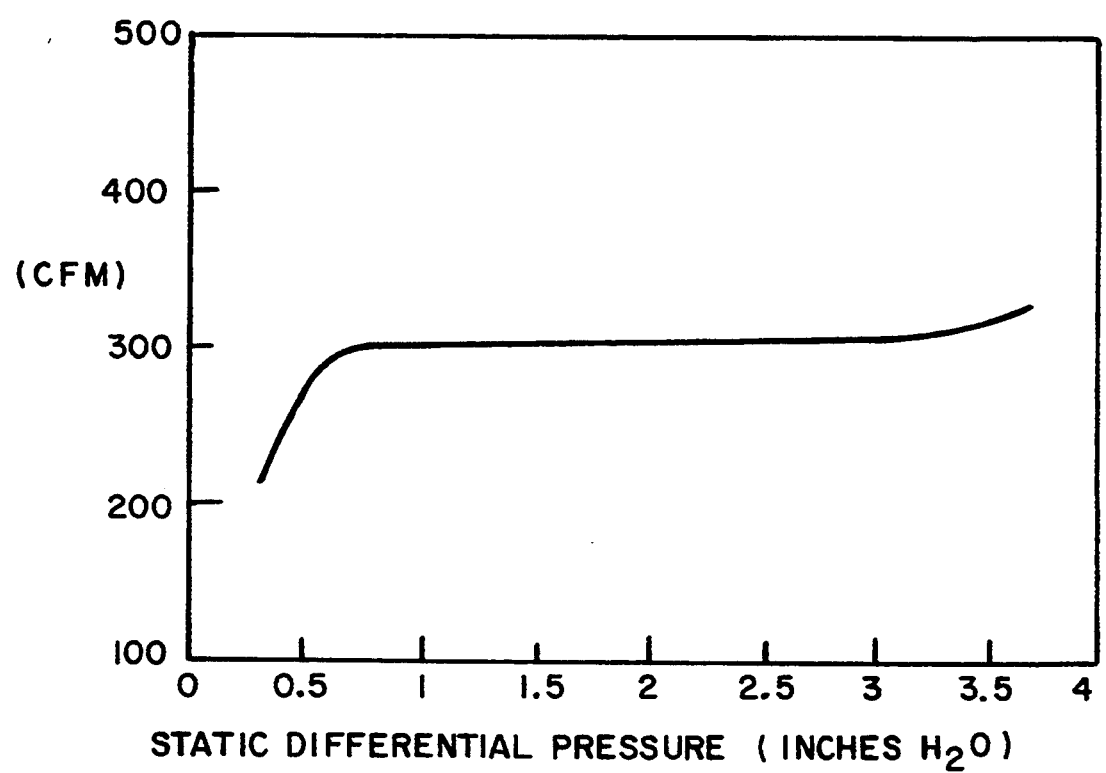
FIG. 3 is an exemplary flow/pressure characteristic curve for a venturi valve of the type shown in FIG. 2.
Figure 10:
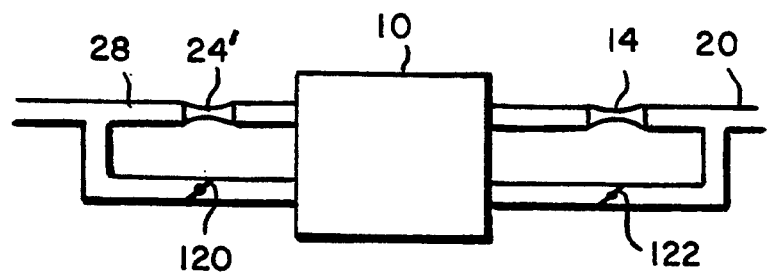
FIGS. 10, 11 and 12 are simplified block diagrams of three additional alternative embodiments of the invention.

FIG. 10 illustrates another way in which a pressure dependent characteristic may be obtained so as to achieve effective leakage for the system while still using a standard venturi valve having a pressure independent characteristic such as that shown in FIG. 3. In FIG. 10, both the supply/tracking valve 24' and the exhaust/driving valve 14 are pressure independent valves. However, each of these valves has a damper, 120 and 122, respectively, mounted in parallel therewith, the dampers 120 and 122 being devices which are substantially pressure dependent. The relative sizes of the main channel containing the pressure independent valve 24' and the parallel channel containing the pressure dependent damper can be selected such that the combined effective characteristic is substantially that shown in FIG. 1A. Valve 14 and damper 122 can be similarly selected. While in FIG. 10 bypass dampers have been shown for both the supply and exhaust valves, and, as previously indicated, the system can be operated with both the supply and exhaust being slightly pressure dependent, typically a bypass damper would only be provided for one of the valves, for example, the valve serving as the tracking valve. For simplicity, the electronic controls have not been shown in FIG. 10, or FIGS. 11 and 12, but these controls would normally be the same as those shown, for example, in conjunction with FIG. 1.

Figure 11:
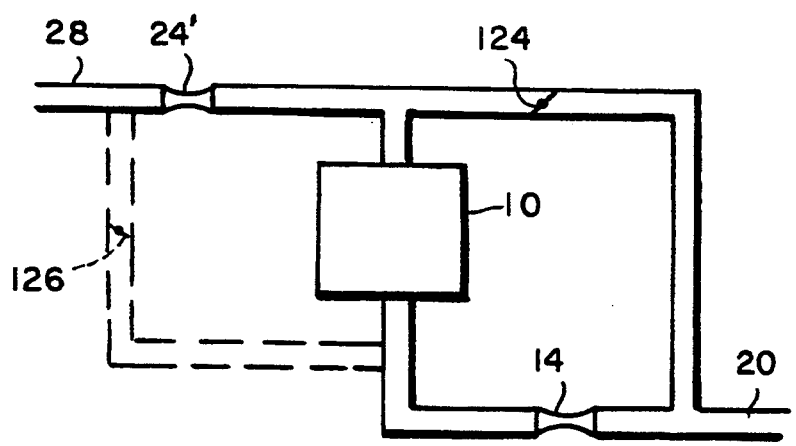

FIG. 11 shows another embodiment of the invention wherein a damper in parallel with either a pressure independent supply or exhaust valve (or possibly both) is utilized to achieve the desired effective leakage. In this case, a damper 124 is connected as a bypass for supply valve 24' to both room 10 and exhaust valve 14. Thus, as the pressure in room 10 increases, the pressure across damper 124 also increases, causing more of the supply from valve 24' to be bypassed, thus reducing the pressure in the room until the pressure in the room again is at a desired level. The equilibrium pressure for damper 24 is at the desired pressure level in room 10. A bypass path around supply valve 24' and room 10 is also shown through damper 126. While it is possible that both dampers 124 and 126 would be utilized in the same system, it is preferable that only one of the bypass paths be provided. As with the embodiment of FIG. 10, the combined flow/pressure characteristic for a valve and room 10 and for the bypass damper for such valve and room is substantially as shown in FIG. 1A.

Figure 12:
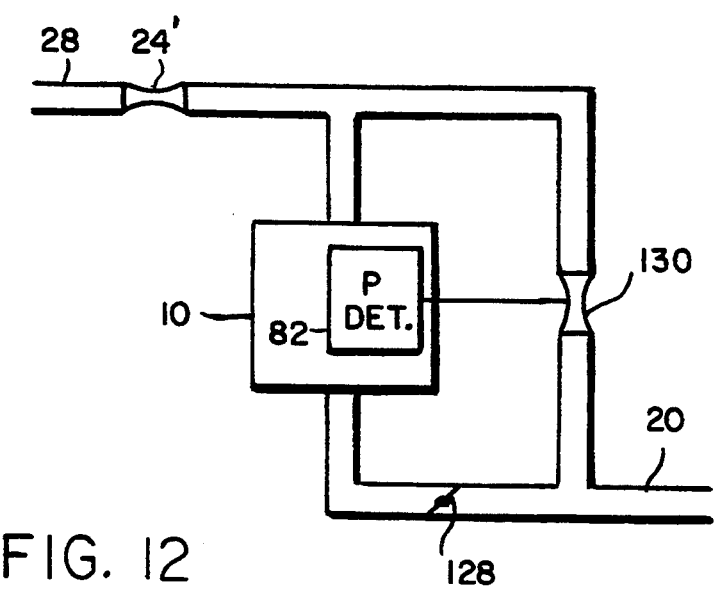

FIG. 12 shows still another possible variation to achieve the desired flow characteristic. In this case, the outlet from the room is controlled by a damper 128 which is pressure dependent, with a bypass around room 10 and output damper 128 being provided through a pressure independent valve 130. The flow through bypass valve 130 is controlled by the output from pressure detector 82 in room 10. Again, the combination of room 10 and damper 128 in parallel with valve 130 are selected to achieve the desired flow/pressure characteristic with a designed somewhat nominal effective leakage.

It should be apparent that while three configurations utilizing bypass dampers are shown in FIGS. 10–12, other configurations for achieving the desired flow/pressure characteristic are also possible and would be apparent to those skilled in the art. Further, while for preferred embodiments, flow through the valve or other flow control element(s) has increased at least nominally for increases in pressure across the element(s), it may also be possible to achieve the desired effective leakage of this invention with flow control element(s) having a designed at least nominal decrease in flow for increases in pressure across the valve.

Further, while in the discussion above, the pressure independent flow control element or valve has generally been assumed to be a venturi valve and the pressure dependent control element or valve has been assumed to be a damper, other elements having the requisite characteristics may also be utilized. For example, in addition to venturi valves, variable volume pressure independent devices which might be suitable for use in conjunction with this invention include Type R volume flow regulators from Trox America, Inc., Type R-Controllers from Price Companies, Inc., air valves and circular positive seal valves from M&I Heat Transfer Products Ltd., air valves from Spiro, Gilflo meters from Gilflo, mark air valves from Rosemex Inc., venturi air valves from Air Precision Devices, and pressure independent air valves from VAV Venturi, Inc. In addition, the pressure independent devices may be constant volume devices such as the Sentry 1000, Sentry 1100 and Sentry 1200 from Progressive Technologies, Inc. and constant air flow regulators (CAR) with spring loaded backdraft damper from American Aldes Ventilation Corporation. Finally, pressure dependent devices include VariTrane air valves from The Trane Company, Pneumavalve from Connor Engineering and positive seal damper from M&I Heat Transfer Products Ltd. Various shut-off valves such as the low leak convex damper from Flanders, shut-off dampers from Ruskin and shut-off valves from Bray Valve & Controls may also be used as pressure dependent devices or, with suitable controls, could be used alone as the partially pressure independent valves used to obtain nominal leakage in accordance with the teachings of this invention.

In operation, for the various embodiments, there will be continuous or at least substantially continuous air flow through both the supply and exhaust valves. For the FIG. 1 and FIG. 8 embodiments, there is air flow through exhaust valve 14 to remove potential toxic fumes from hood 12 and there is air flow through supply valve 24 to make up for the air being exhausted from the room. Air coming in through supply valve 24 also provides heat/air-conditioning and ventilation to the room. For the FIG. 6 embodiment, air is being substantially continuously supplied through supply valve 24 for ventilation and for heat/air-conditioning purposes, with air flowing through exhaust valve 14 to maintain a desired pressure in the room.

For the FIG. 1 and FIG. 8 embodiments, the position of the exhaust valve controller (i.e. the output from its potentiometer 64, FIG. 2) is applied to summing circuit 74 where it is summed with the modified pressure error signal on line 74. The resulting output signal causes the tracking valve to move in a proper direction to correct any pressure imbalance and to maintain equilibrium between the flows, the movement of the tracking valve being at a rate which is rapid enough to provide good response, but assures that overshoots do not occur. This process continues with the tracking or supply valve being moved in the appropriate direction each time there is a change in the position of the driving or exhaust valve and/or each time the actual pressure in room 10 deviates from the pressure set point. As previously indicated, the embodiment of FIG. 6 operates in substantially the same manner, with the exception that the roles of the supply and exhaust valves are reversed, the supply valve being the driving valve and the exhaust valve being the tracking valve. Further, except for the pressure set point, the operation would be the same as that indicated above for each embodiment regardless of whether room 10 is to be positively or negatively pressurized.

While in the discussion above the fluid flowing through valves 14 and 24 has been air, it is apparent that the teachings of this invention could be utilized in other applications where it is desired to maintain a sealed environment containing a gas or other fluid at a precisely controlled pressure, with there being a continuing need to supply and/or remove fluid from the environment while still maintaining the pressure. Further, while for the preferred embodiment the sealed environment has been a room, it is apparent that this invention could be practiced in, for example, a submarine, space craft, or other sealed environment where a requirement exists to maintain a pressure in such environment different from that of its surroundings while still having air or other fluid circulating through the environment. Thus, while the invention has been particularly shown and described above with reference to preferred embodiments, the foregoing and other changes in form and detail may be made therein by one skilled in the art without departing from the spirit and scope of the invention.

What is claimed is:

1. A system for maintaining a desired pressure in a substantially sealed enclosed space comprising:
   a gas supply at a pressure above the desired pressure;
   a gas exhaust at a pressure below the desired pressure;
   a supply flow control element and an exhaust flow control element for connecting said supply and said exhaust, respectively, to said enclosed space,;
   means for generating a first signal indicative of the instantaneous pressure in the enclosed space;
   means for generating a second signal indicative of intended flow through a driving one of the two control elements;
   means responsive to said first and second signals for controlling flow through a tracking one of said two control elements; and
   means for providing a designed, at least nominal, effective leakage for the space with changes in the pressure differential between the space and at least one of the gas supply and gas exhaust.

2. A system as claimed in claim 1 wherein said means for providing effective leakage includes at least a leakage one of said flow control elements to have a designed, at least nominal change in flow for change in pressure across the element over an operating pressure range for the element, the change in flow for pressure changes for the other flow control element being no greater than that for the leakage one of the elements.

3. A system as claimed in claim 2 wherein each of said flow control elements is a venturi valve, with the venturi valve for the leakage one of the elements being mechanically modified to be only partially independent of pressure changes thereacross.

4. A system as claimed in claim 3 wherein the venturi valve for the nonleakage one of the control elements has a flow characteristic which is substantially independent of pressure over the operating pressure range of the element.

5. A system as claimed in claim 2 wherein the leakage one of the flow control elements is an element which is electronically modified to be partially independent of pressure changes thereacross.

6. A system as claimed in claim 5 wherein the leakage element is a pressure dependent element which is electronically modified to be partially independent of pressure changes thereacross.

7. A system as claimed in claim 5 wherein each of said flow control elements is a substantially pressure independent valve, with the valve for the leakage one of the elements being electronically modified to be only partially independent of pressure changes thereacross.

8. A system as claimed in claim 5 including means for detecting the pressure differential across the leakage element valve, and means for utilizing the detected pressure differential across the valve to control the flow through the valve in a manner so as to achieve the said at least nominal change in flow for pressure changes.

9. A system as claimed in claim 2 wherein a leakage flow control element includes a flow control element having a substantially pressure independent flow/pressure characteristic in parallel with a flow control element having a pressure dependent flow characteristic.

10. A system as claimed in claim 9 wherein the element having a pressure independent characteristic is a venturi valve and the element having a pressure dependent characteristic is a damper.

11. A system as claimed in claim 9 wherein the space is in series with one of the parallel-connected flow control elements.

12. A system as claimed in claim 2 wherein both of said control elements are leakage elements having flow characteristics with nominal changes in flow for changes in pressure across the element over said operating pressure range.

13. A system as claimed in claim 2 wherein the change in flow for pressure changes over said operating pressure range is in a range of approximately 5% to 20%.

14. A system as claimed in claim 1 wherein said leakage element is said exhaust flow control element.

15. A system as claimed in claim 1 wherein said leakage element is said supply flow control element.

16. A system as claimed in claim 1 wherein the driving one of the control elements is the exhaust flow control element, said means for controlling operating to control the supply flow control element.

17. A system as claimed in claim 1 wherein said means for controlling flow through the tracking element includes means for receiving a pressure set point signal indicative of desired pressure in said space, and means for generating a pressure error signal in response to differences between said pressure set point signal and said first signal.

18. A system as claimed in claim 17 wherein said means for controlling air flow further includes means for combining said pressure error signal and said second signal to generate a flow control signal for said tracking control element.

19. A system as claimed in claim 17 wherein said means for generating a pressure error signal includes means for receiving an indication of flow for said tracking control element, and means responsive to said indication of flow for modifying the error signal so as to limit the rate of change in flow for said tracking control element.

20. A system as claimed in claim 17 wherein said means for generating a pressure error signal includes means for generating a lag compensation signal, and means for utilizing said lag compensation signal in controlling the flow through said tracking control element.

* * * * *